Feb. 5, 1935.　　　　M. A. LAABS　　　　1,990,126

OPHTHALMIC LENS

Original Filed Dec. 27, 1927

INVENTOR
Max A. Laabs.
BY
Harry H. Styll
ATTORNEY

Patented Feb. 5, 1935

1,990,126

UNITED STATES PATENT OFFICE 1,990,126

OPHTHALMIC LENS

Max A. Laabs, Southbridge, Mass., assignor to American Optical Company, Southbridge, Mass., a voluntary association of Massachusetts Original applications December 27, 1927, Serial No. 242,637, and December 12, 1930, Serial No. 501,879. Divided and this application June 20, 1932, Serial No. 618,194

3 Claims. (Cl. 88—54)

This invention relates to an improved multifocal or bifocal lens and has particular reference to a fused multifocal or bifocal lens.

This application is a division of my application for United States Letters Patent filed in the United States Patent Office December 27, 1927 and given the Serial Number 242,637 and which has become patent serial No. 1,871,123, dated August 9, 1932 and of my application for Letters Patent filed December 12, 1930, Serial Number 501,879, and is directed to the product itself, namely a novel multifocal or bifocal lens and/or lens blank.

The principal object of the invention is to provide a multifocal or bifocal lens or a blank for the same with a fused segmental portion having an irregular outline shape, that is to say an outline a portion of which departs from a full circle, whereby portions of the outline have different radii of curvature or one portion of the outline intersects another portion instead of being tangential thereto.

Another object of the invention is to provide improved means for shaping and/or surfacing the fusing surfaces of such multifocal or bifocal lenses having segments of irregular outline.

Other objects and advantages of the invention will become apparent from the following description taken in connection with the accompanying drawing and it will be apparent that many changes in the steps of the process and the arrangement and details of construction of the parts may be made without departing from the spirit of the invention as set forth in the accompanying claims. I, therefore, do not wish to be limited to the exact arrangements shown and described, the preferred forms only having been shown by way of illustration.

There has been a marked effort in the art recently to perfect a so-called monaxial or monocentric multifocal or bifocal ophthalmic lens wherein a small segment of glass of one index of refraction is fused into a larger section of glass of different index of refraction. There have been two distinct methods of obtaining this result. One of these methods comprised grinding a circular countersink in the major blank and making a circular segment to fit in this countersink, the said segment being split through its center, the upper half being of glass of the same index of refraction as the major blank and the lower half being of different index of refraction from the major blank. These two halves were first fused together and then the fused segment or button was again fused into the recess in the major blank thus making two fusing operations necessary.

Another method was to grind a circular countersink in the major blank as before and to fuse a circular segment of different index of refraction into the ground countersink, then to split the major blank through the center of the countersink and then fuse along the split edge another piece of glass of the same index of refraction as the major blank. This also involved two fusing steps, first fusing the segment into the countersink and then fusing a separate piece of glass along the split edge. The fusing operation is a very expensive one, probably the most expensive step in the production of fused multifocal lenses. There are certain chemical reactions which take place in the fusing and where a double fusing is necessary the optical properties of the finished product are likely to be destroyed.

It is, therefore, one of the principal objects of my invention to avoid this double fusing and to make a fused multifocal lens so that the segment may be fused into the major blank with one operation only.

The outline shape of the segments has been circular. It has been found that segments not circular in outline but of various odd shapes, such as embodying the combinations of straight and curved lines, all straight lines or a combination of curves of different radii possess advantages not present in the circular form. It has been difficult and expensive if not impracticable to produce such odd shape segments and particularly the recesses for such segments. It is therefore also one of the principal objects of my invention to provide simple, efficient and economical means of producing such odd shape segments and the recesses therefor.

Referring to the drawing.

Figure 1:
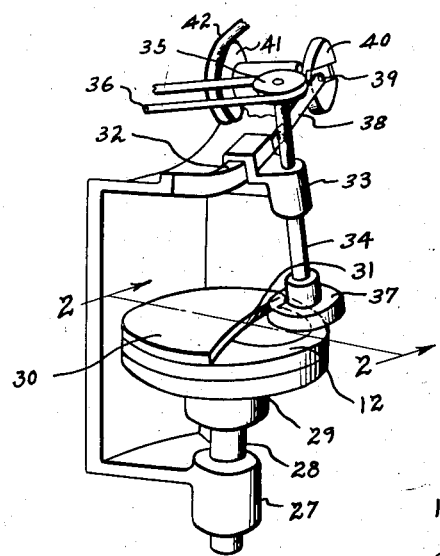
Fig. 1 is a partial perspective view of a surfacing apparatus showing the method of grinding the countersinks in the major blanks.

Referring to the drawing wherein similar reference characters denote corresponding parts throughout, the principal object of the invention is to make in one face of a major lens blank 1 a recess or countersink 2 having the outline shapes indicated in Figs. 5, 6, 7 and 8 as well as other shapes. It will be understood that the under surface 3 of the countersink 2 is a regular shaped lens surface, preferably spherical in formation, which is preferably ground and polished to the required surface conformation. It will be understood also that the angle at which this surface 3 is placed to the face surface 4 of the lens is important as bearing on the amount of displacement in passing from the upper or distance field 5 to the segment or reading field 6. In monaxial or monocentric multifocal lenses this angular relationship is such that there is no displacement of image in passing from the distance field 5 to the reading field 6 and it is one of the important features of my apparatus and process to provide means of making the surface 2 so related to the distance field 5 that if desired I can produce monaxial or monocentric multifocal lenses requiring only one fusing. It will be understood that the segment or reading portion 6 is fused into the countersink or recess 2 or otherwise secured therein.

Figure 5:
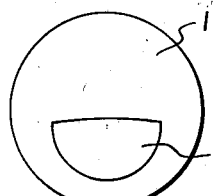
Fig. 5 is a front view of a multifocal lens blank showing the countersink portion surfaced as indicated in Fig. 1.
Figure 6:
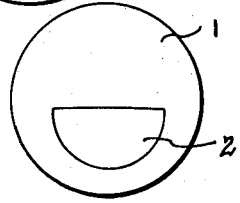
Fig. 6 is a front view of a multifocal lens blank showing one form of recess therein as surfaced on the apparatus of Fig. 4.

It will be noted that the shape of the segment 2 in Fig. 5 has an upcurve top and a downcurve lower portion while that shown in Fig. 6 has a straight top and a down curved lower portion. The recess shown in Fig. 7 has a down-curve top and a down-curve bottom, while that shown in Fig. 8 has the top and bottom both straight.

It will be seen, therefore, the countersink portion 2 of various shapes can be formed and surfaced by guiding means to give the shape required. One method of producing the recesses 2 shown in Figs. 5, 6, 7 and 8 is indicated in Fig. 1. This apparatus comprises a support 27 in which is mounted the lens holder support 28 carrying the lens holder 29. The lens blank 12 is mounted on the lens holder 29 and on top of the lens blank 12 is placed a guide member 30 having an edge shape 31 of the desired conformation. The frame 27 also carries a double cam curve guide member 32 which has one cam curve conformation to which the under surface 3 of the countersink is to be finished and another to which the top shape of the countersink is to be finished. Travelling on the guide cam member 32 is the slide 33 carrying the tool spindle 34 which is rotated by the pulley 35 and belt 36. Mounted on the spindle 34 is the surfacing tool 37 having a surfacing face of the curvature to which is desired to surface the under surface 3 of the countersink. The slide 33 is moved back and forth on the guide way 32 by the link 38 pivotally secured at 39 to the eccentric 40, which eccentric 40 is rotated by the pulley 41 and the belt 42. The operation of this device is as follows: The guide member 30 having the desired shape edge 31 is arranged in place over the lens blank 12. The tool 37 is rotated by the belt 36 and is oscillated back and forth along the edge 31 of the guide member 30 by means of the cam guide 32 and the eccentric 40 and its attachments. In this way contours may be ground of the shape shown in Figs. 5, 6, 7 and 8. In all instances one curve of the cam guide 32 and the edge 31 must be the same. The guide plate 30 may be done away with if desired as the same result will be obtained by the double cam guide 32, the plate 30 being used only as an extra guide for the tool on the lens.

Figures 9, 10:
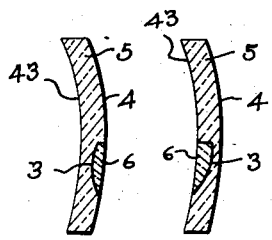
Fig. 9 is a cross section on line 10—10 of Fig. 7.
Fig. 10 is a view similar to Fig. 9 showing the countersink formed on the opposite side of the lens.

After the countersink 2 of desired outline shape and of desired surface formation has been formed in the major blank 1 a segment 6 is fashioned to fit therein and is thereafterwards fused or otherwise secured in place. After the segment 6 has been fused in place the surface 4 is placed on the blank. This surface is continuous over the major portion 5 as well as over the segment 6 and the proper angular relationship of the recess of countersink 2 to the surface 4 may be determined at the time the surface 4 is placed on the blank, the height and the width of the reading portion determining the relationship, whether monaxial with the major portion or eccentric thereto. After the surface 4 has been placed on the fused blank the prescription curve 43 may be ground on the other side to give the desired prescriptive properties of the finished lens. It will be seen from Figs. 9 and 10 that the segment 6 may be placed either on the concave or on the convex side of the lens that is, either on the front or the rear side of the lens as desired.

Figure 3:
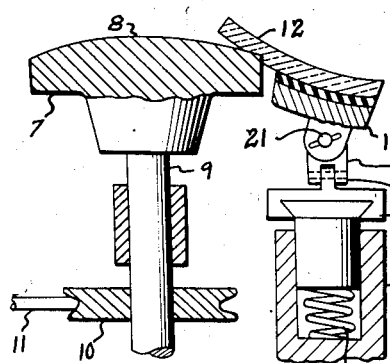
Fig. 3 is a partial sectional elevation of a surfacing apparatus similar to Fig. 1 but showing a modification thereof.
Figure 8:
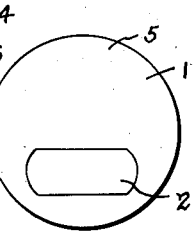
Fig. 8 is a view similar to Fig. 7 showing another outline shape of countersink as made on the apparatus of Fig. 1.
Figure 4:
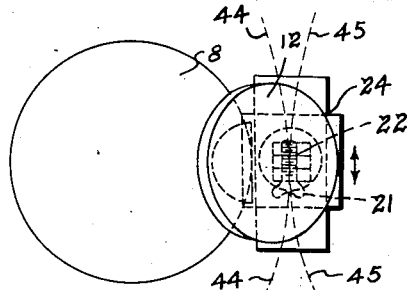
Fig. 4 is a top view of Fig. 3.

Referring to Fig. 1, it will be understood that one curvature of the guide cam 32 is the same as the surfacing curvature of the tool 37 and the other curvature thereof the same as the edge shape 31 of the guide plate 30.

Where it is desired to fashion the countersink 2 with a straight line at the top as shown in Fig. 6 one of the cam curves on the guide 32 and the edge 31 on the plate 30 may be made straight, or an apparatus such as shown in Fig. 3 may be used. This comprises as before the tool 7 having a spherical grinding surface 8 mounted on the spindle 9 rotated by the pulley 10 and belt 11. The lens blank 12 is mounted on the lens holder 13 which is pivoted at 21 to a link 22 which is again pivoted at 23 to a slide 24 resiliently mounted in a slide support 25 and backed by the spring 26. The operation of this device is as follows: The holder 13 is locked at 21 to the desired angle and the blank 12 may be moved to conform to the surface 8 of the tool about the pivot 23. The tool 7 is rotated with the lens blank 12 in contact therewith as shown in Fig. 4. The operator presses the blank 12 down against the spring pressure 26 with his hand and moves the holder 13 along the slide 24, at the same time rocking it about the pivot 23. This produces the shape of countersink or recess shown in Fig. 6, that is, one having a straight top and a downwardly curved lower portion.

Figure 7:
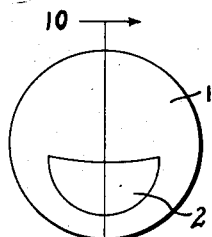
Fig. 7 is a view similar to Fig. 6 showing another shape of the recessed countersink as made on the apparatus of Fig. 1.
Figure 2:
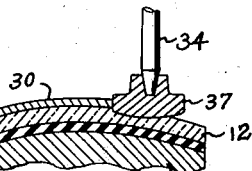
Fig. 2 is a partial section on line 2—2 of Fig. 1.

To produce a lens such as shown in Fig. 5 the slide 24 may be curved as indicated by the line 44 in Fig. 4 and to produce the lens shown in Fig. 7 the slide 24 may be curved as indicated by the line 45 in Fig. 4. To produce the lens shown in Fig. 8 a tool such as 37 is used having a diameter equal to the distance between the top and bottom of the countersink 2. This lens may be made by an apparatus such as shown in Fig. 1.

The outlines of the segments and recesses for them may be made in other ways, such as moulding them to approximate shape and size and finishing as described above or they may be moulded or pressed while in plastic condition from heat to the desired outline.

From the foregoing it will be seen that I can make on the major blank of a multifocal lens a countersink or recess surface of desired surface conformation and desired contour shape whereby I may make a multifocal lens having its segment either in monaxial relationship to the major section or in eccentric relation thereto as desired.

Having described my invention I claim:

1. A multifocal or bifocal lens comprising a major portion of lens medium of one index of refraction having a seat thereon, said seat being located in the lower portion of said major portion and being spaced from its contour edges, the sides and bottom edges of said seat being a continuous line of revolution and the top thereof being a transverse curved edge of a radius greater than the radius of the continuous line of revolution and intersecting said line at the sides of the seat and being concaved downwardly with respect to the horizontal meridian of the lens, and a minor portion of glass of different index of refraction secured to said seat and conforming in outline thereto, the top edge of said minor portion having substantial thickness and the side and bottom edges thereof having substantially no thickness, the said top edge being located adjacent to and throughout the major portion of its length below the center of the major portion the concavity of the said top edge being such as to provide a wide entrant field of vision when the eye passes from one focal field into the other.

2. A multifocal or bifocal lens comprising a major portion of lens medium of one index of refraction having a seat thereon, said seat being spaced from the contour edges of the major portion, the sides and bottom edges of said seat being a continuous line of revolution formed by the intersection of two differently generated curves on one face of the major portion and the top thereof being a transverse cliff type edge having a curved surface which is concaved downwardly with respect to the horizontal meridian of the lens, and a minor portion of lens medium of different index of refraction secured to said seat and conforming in outline thereto, the top edge of said minor portion having substantial thickness and the side and bottom edges thereof having substantially no thickness, the said top edge being located adjacent to and throughout the major portion of its length below the center of the major portion, the concavity of the top edge being such as to provide a wide entrant field of vision when the eye passes from one focal field into the other.

3. A multifocal or bifocal lens comprising a major portion of lens medium of one index of refraction having a seat thereon, said seat being spaced from the contour edges of said major portion, the sides and bottom edges of said seat being a continuous line of revolution formed by the intersection of two differently generated curves on one face of the major portion and the top thereof being a transverse cliff type edge having a curved surface of a radius greater than the radius of the continuous line of revolution and intersecting said line at the sides of the seat and being concaved downwardly with respect to the horizontal meridian of the lens, and a minor portion of lens medium of different index of refraction secured to said seat and conforming in outline thereto, the top edge of said minor portion having substantial thickness and the side and bottom edges thereof having substantially no thickness, the said top edge along the vertical meridian of the lens being located adjacent to and below the center of the major portion, the concavity of the said top edge being such as to provide a wide entrant field of vision when the eye passes from one focal field into the other.

MAX A. LAABS.